Sept. 9, 1969          A. C. LEENHOUTS          3,466,517
NUMERICALLY CONTROLLED MOTOR SYSTEM
Filed Dec. 15, 1966          2 Sheets-Sheet 1
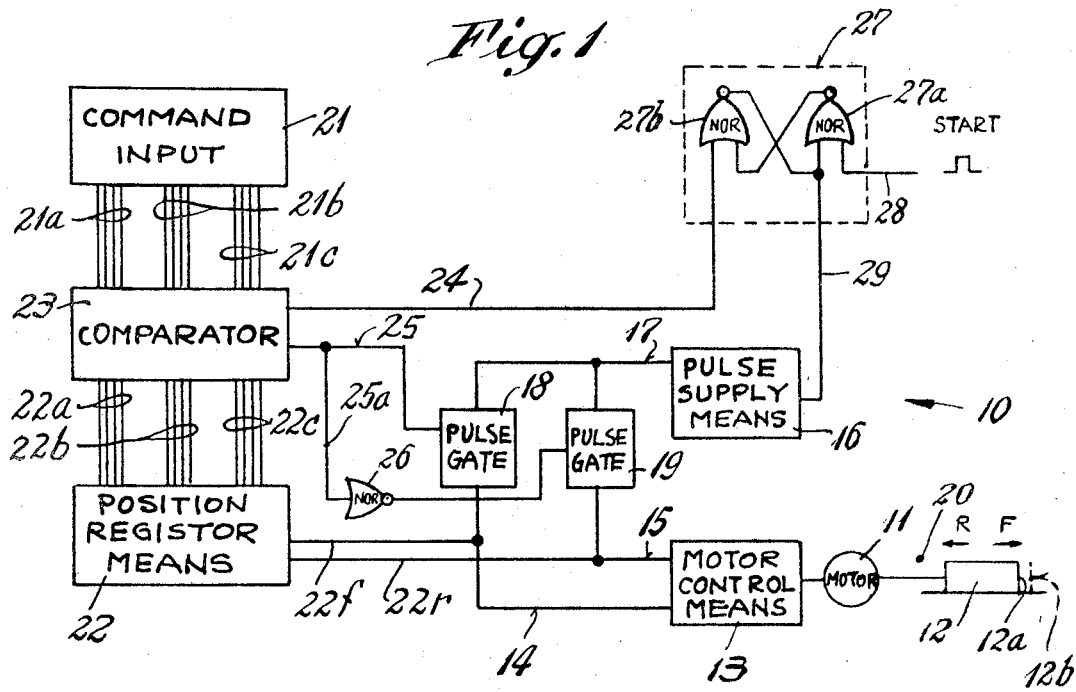
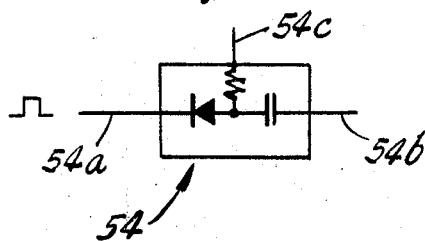
INVENTOR.
Albert C. Leenhouts
BY
Johnson and Kline
ATTORNEYS United States Patent Office 3,466,517
Patented Sept. 9, 1969

3,466,517
NUMERICALLY CONTROLLED MOTOR SYSTEM
Albert C. Leenhouts, Granmy, Conn., assignor to The Superior Electric Company, Bristol, Conn., a corporation of Connecticut
Filed Dec. 15, 1966, Ser. No. 601,981
Int. Cl. H02p 1/54, 5/46, 7/68
U.S. Cl. 318—18                                15 Claims

ABSTRACT OF THE DISCLOSURE

A numerical control system having a stepping motor that moves a discrete increment for each pulse supplied to a motor controller, in which the input information of a desired movement is in absolute form and in which a position register electrically maintains the present location of the motor by the value of its count. The system has an oscillator means that supplies pulses to the motor control and also to the position register means with the latter changing its count as the motor moves. The direction and extent of motor movement is controlled by continuously comparing the count of the position register and the input information and supplying pulses until coincidence occurs. The system further provides for operating the motor at higher speeds during its intermediate portion of movement than at either of its end portions of movement.

---

The present invention relates to a system for causing an extent and direction of movement of a motor in accordance with input information, such as electrical signals, and more particularly to such a system in which the input information is determined by a reference point and the desired position of the motor with the system moving the motor an extent and in a direction from wherever it is at to the desired position commanded by the input information.

Numerically controlled motor systems are generally classified into two types depending on the manner in which the input information is supplied. One type is known as the point-to-point system and the input information consists of a numerical command that indicates the direction and extent of movement of the motor from where it is at to the desired position. Thus each input command must be determined from where the motor position is which is generally that caused by a previous command to the position where it is desired for the present command. The other type is generally known as an absolute system and use is made of a reference point. In the absolute system, the command information consists only of a number indicating the desired position of the motor from the fixed reference point. The system includes a circuit that maintains information relating to the position of the motor and the command information is compared therewith to obtain the difference which indicates the extent and direction which the motor must move from its last position to the command or desired position. While both systems have advantages with respect to determining input information, producing movement within selected tolerances, tolerating error, etc., the absolute system, by reason of its manner of operation, has been heretofore generally quite complex, requiring additional circuitry.

In U.S. Patent No. 3,241,017, assigned to the assignee of the present invention, there is disclosed a point-to-point system using a stepping motor. The motor is caused to move one rotational increment for each change of energization which it receives and the direction of movement is determined by the sequence of changes of energization. The motor is usually connected to a load which may be a linearly movable load, such as a milling machine bed, and it will be moved a definite distance for each incremental movement of the motor. A motor control means is connected to the motor and supplies the changes of energizations and the sequence thereof in accordance with pulses that it receives with, in the embodiments shown, one pulse producing one incremental movement of the motor. The input information consists of a number of pulses and a direction so that the system will supply the same number of changes of energization to the motor in the direction sequence necessary to cause the motor to move the load the distance correlated to the number of pulses and then stop. The next input information is again a number and a direction and the motor moves from its last position to its new commanded position as determined by the number of pulses and direction.

It will be understood that this system disclosed in the above-noted U.S. patent is incapable, per se, of responding to input information in absolute form and for it to be used with absolute information, complex circuitry had been considered necessary in order to convert the absolute information into point-to-point information.

It is accordingly an object of the present invention to provide a numerically controlled system that utilizes a stepping motor and responds to input information of the absolute form in which the system is relatively extremely simple in construction.

Another object of the present invention is to provide a system that achieves the above object but yet which does not convert the absolute form information into point-to-point information prior to utilization.

A further object of the present invention is to provide a numerically controlled system of the absolute type in which a higher rate of errorless operation of a stepping motor is capable of being achieved by only operating the motor at high speed during the intermediate portion of its movement.

Still another obpect of the present invention is to achieve the above-noted objects with a system that utilizes only a small number of parts for the functions performed, is relatively economical to manufacture and is durable in use.

The numerically controlled system of the instant invention includes the stepping motor and the motor control means disclosed in the above-noted U.S. patent. The control means has two input channels and pulses are directed to one or the other with a pulse on one channel causing the motor to be moved one incremental step in one direction while a pulse on the other channel causes the motor to move an incremental step in the other direction. An oscillator is also provided which upon energization supplies pulses at a predetermined rate with the pulse rate regulating the speed of the motor.

In accordance with the present invention, the input information, which in absolute form may be an electrical representation in binary coaded decimal of a three digit decimal number, is maintained in a command input means. This means may be manually settable switches or three decades of binary storage elements, such as flip-flops if the information is received from punched tape and thus the command input continuously provides an electrical representation of the command information. A position register means, which in the embodiment shown is essentially an up-down binary coded decimal counter of three decimal digits to correspond in scope and electrical representation with the command input means, is connected to count the number of pulses that the motor control has received from the time it was at a set or fixed position. The position register means preferably increases its count by a unit digit for each pulse delivered to the forward channel of the motor control means and decreases its count by a unit digit for each pulse delivered on the reverse channel. Thus the position register means provides an electrical representation of the position of the motor from a set or fixed position and changes its count with each pulse delivered to the motor control means. The fixed position from which the position register counts and the fixed reference from which the absolute information is determined may be the same point in any event, they have a positive unchanging relation to each other.

The count of the position register means and the count of the command input means are then compared in a comparator which provides signals indicating the various conditions namely, the command input count exceeds the position register count, the position register count exceeds the command input count or they are equal.

Upon initiation of the system to effect movement of the motor the extent and direction required to achieve the command position, if the comparator shows that the representations are not equal, the oscillator means is energized and supplies pulses to the motor control means and position register means. It continues the supplying of pulses until the count of the position register means is the same as the command input, when the equal condition occurs to prevent further energization of the oscillator means. The channel on which the pulses appear is controlled by the indication of the comparator as to which count is greater.

In the above system, the actual numerical difference is not determined either prior to or while the motor is operated and the termination signal may appear with any pulse without any advance indication of this one pulse that will cause the command input count and position register means count to be equal. When the motor utilized in the instant system is desired to be operated at a high speed, it is required that the beginning pulses and the termination pulses of the train of pulses required to move the motor the desired extent be at a rate which is slower than the faster intermediate pulses in order to enable the motor to move errorlessly one step for each pulse. In another embodiment of the invention, the above system has incorporated therewith as part of the position register a buffer counter that is essentially an up-down counter having a capacity that at least equals the number of pulses required to decelerate the motor errorlessly. Also the oscillator is of the type whose rate of supplying pulses may be varied. Interconnected with these components is a logic circuit that at the beginning of each movement initially directs pulses to the buffer counter and to the position register means but not to the motor. When the number of pulses received by the buffer counter is such as to cause it to be at its "up" limit, i.e. full, the buffer counter provides a signal to the oscillator to cause it to begin pulses at a slow but increasing rate until it achieves its high speed rate. In addition, by being full, it blocks further pulses to it while enabling the pulses to be delivered to the motor control means.

The pulses will continue at high speed, the motor move and the position register means shift its count until the comparator signals that the position register means count and the command input count are identical. This signal is utilized to prevent further pulses to change the count of the position register means, shift the oscillator from its high rate pulses to a decreasing low rate and enable pulses to be supplied to the buffer counter to cause it to count oppositely from its full count to its empty or zero count. As the slower speed pulses are delivered, the motor decelerates and the buffer counter shifts its count until it has reached zero count and supplies a signal indicative thereof. The zero buffer counter count signal prevents further operation of the oscillator as the motor has achieved its commanded position and the position register means is equal in count to the commanded position.

Other features and advantages will hereinafter appear.

In the drawing:

FIGURE 1 is a block diagram of an absolute numerical control system according to the present invention.

FIG. 3 is a schematic diagram of a pulse gate.

Figure 2:
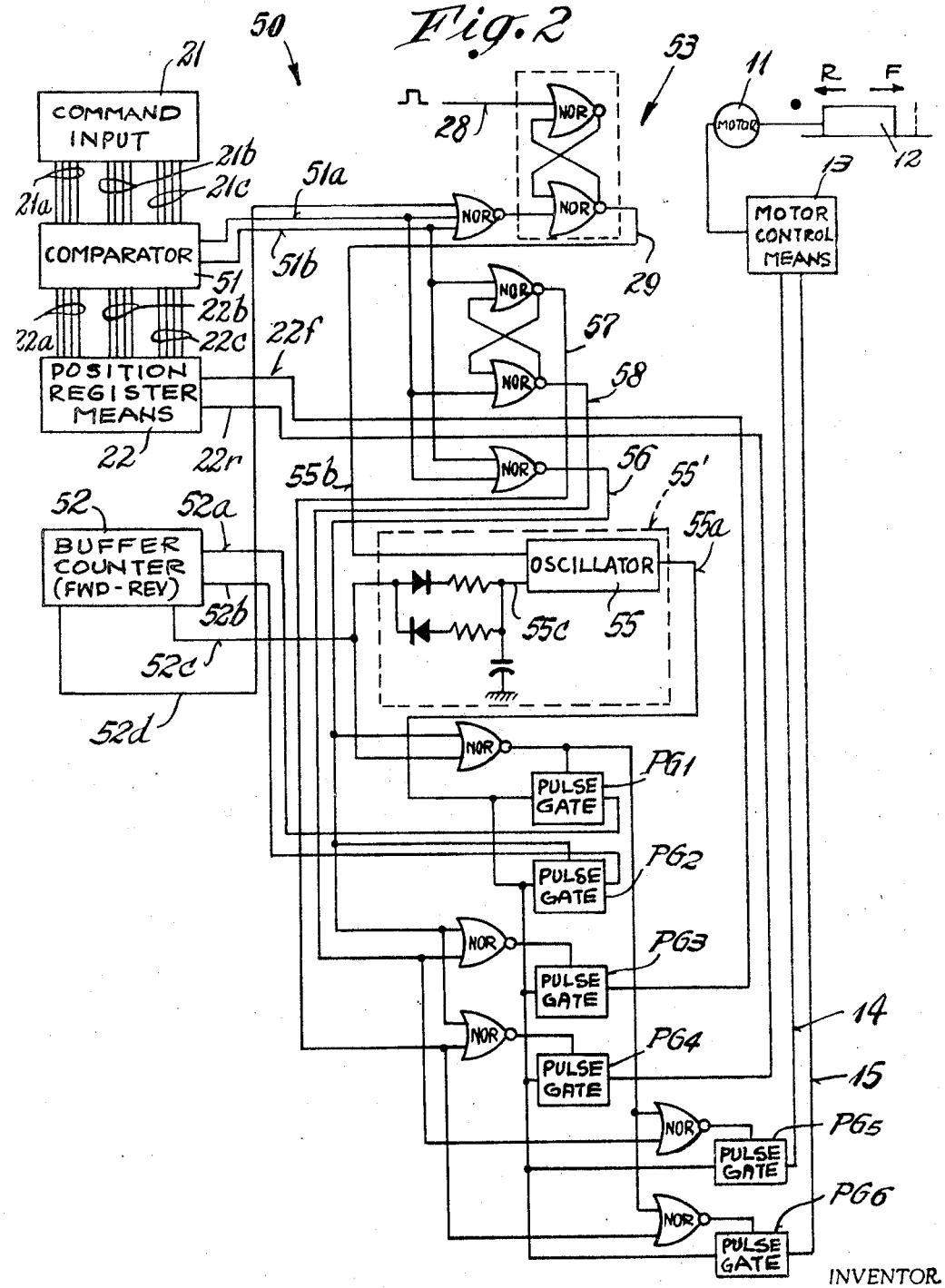
FIG. 2 is a block and logic diagram of a further embodiment thereof in which the motor is capable of operating errorlessly at higher speeds.

Referring to FIG. 1, the system is generally indicated by the reference numeral 10 and includes a motor 11 which may be connected to linerally move a load 12. The motor is energized from a motor control means 13 by the appearance of pulses on a forward input channel 14 or a reverse input channel 15. As more fully disclosed in the above-noted U.S. Patent, the control means 13 accepts a pulse on either channel 14 or 15 and by appropriate circuitry changes the energization of the motor one change for each pulse. The direction of the motor may be changed by altering its sequence of changes of energization and thus the control means for a pulse on the lead 14 causes energization of the motor for movement in a forward direction while each pulse on the reverse input channel 15 is translated by the controller to a change in energization of the motor to cause it to move in the opposite or reverse direction. The motor is more fully shown in U.S. Patent No. Re. 25,445 and for each change of energization will produce a small incremental step, such as 1.8 degrees.

In the embodiment of the system shown in FIG. 1, pulses are produced by an oscillator 16 onto a lead 17 with the latter being connected through a pulse gate 18 to the forward channel 14 and through a pulse gate 19 to the reverse channel 15. Accordingly, pulses appearing on the lead 17 may be directed either to the forward channel or the reverse channel of the motor control means 13.

In the absolute system utilized in the present invention, the information supplied consists only of a number which is obtained by dividing the distance between a fixed reference point diagrammatically illustrated and indicated by the reference numeral 20 and where the load is commanded to be, by the distance the load is moved by each change of energization. If it is desired to move the edge 12a of the load 12 to the dotted line commanded position 12b, the number supplied to the command input is equal to the distance between the point 20 and the edge 12b divided by the linear incremental distance the motor control means causes the load to move for each pulse received. The command number is supplied to a command input 21 in the form of an electrical representation of a number and the electrical representation is maintained until at least the load has been moved to its commanded position. Thus the command input may be merely adjustable switches which are set to provide the representation of the desired number or it may be other storage elements such as flip-flops which are set to be representative of information supplied from a punched tape or other information bearing medium.

In the specific embodiment, the representation is in the form of a binary coded decimal number, with the number having three digits. The command input 21 thus has three sets of leads 21a, 21b and 21c with each lead capable of having a binary coded electrical representation of a decimal number. The set 21a may be for the units digit of the number, the set 21b for the tens digit and the set 21c for the hundreds digit of the command information number.

The system further includes a position register 22 that is essentially an up and down counter. It has an "up" or increasing count lead 22f and a "down" or decreasing count lead 22r, with the former being connected to the forward channel 14 and the latter to the reverse channel 15. Preferably the position register has the same capacity as the command input and stores information in the same manner. In this embodiment it is thus complementary to the command input by having three binary coded decimal decades. The units digit binary electrical representation appears on leads 22a, the tens digit representation on the leads 22b and the hundreds digit representation on the leads 22c. The leads 22a, 22b and 22c are connected to the comparator. It will be understood that while the command input 21 and the position register means 22 are specifically disclosed as storing information in the form of binary coded decimal digits, they may store such information in other forms but for convenience should store in the same form in order to facilitate comparison.

Interconnected with the leads 21a–21c and leads 22a–22c is a comparator 23 having an equal output lead 24 and another output lead 25. The comparator may consist of a plurality of NOR gates and it is designed to provide a voltage level, i.e. a 1 or plus, on the lead 24 whenever the count of the command input and the count of the position register means is equal. For the condition where they are not equal, and the command input count is greater numerically then the lead 25 has a voltage level or is at its 1 condition. For the other condition, where the command input count is the lesser, neither lead 24 nor 25 has a plus or 1 condition. The lead 25 is connected to the pulse gate 18 to enable passage of pulses from the lead 17 to the lead 15 whenever the lead 25 has a 1 condition. Similarly, there is provided a lead 25a that includes a NOR gate 26 connected to the pulse gate 19 and a 0 condition on the lead 25 will be inverted by the NOR gate 26 into a 1 condition and thus enable pulses to pass from the lead 17 to the lead 14.

The system further includes a flip-flop 27 consisting of a plurality of NOR gates 27a and 27b. A lead 28 is connected to one of the inputs of the NOR gate 27a while the lead 24 is connected to one of the inputs of the NOR gate 27b. Further, an output of one NOR gate is connected to the input of the other and in addition a lead 29 is connected to the output of the NOR gate 27b. It will be understood that when pulses are being supplied to the motor control means 13, a voltage level or 1 condition exists on the lead 29 caused by the NOR gate 27b having both inputs at 0 condition which renders it to have its output at the 1 condition. Moreover, for the other condition when pulses are not being supplied by there not being a voltage on the lead 29, there is a 1 condition on the lead 24 which causes the output of NOR gate 27b to be at the 0 condition.

In the operation of the system of the present invention, the command input 21 is set to the electrical representation of the position to which it is desired to move the motor or the load 12, such as to the position 12b from the position 12a. A positive signal, such as a voltage pulse, is applied on the lead 28 which makes its output in the 0 condition and is applied to an input of the NOR gate 27b. The comparator 23 compares the hundreds digits, then the tens digits and the units digits of the counts of the position register means and the command input means and if they are not equal, then a 0 condition exists on the lead 24. Accordingly, the NOR gate 27b by having both inputs in the 0 condition will have a 1 condition output. This output maintains the NOR gate 27a output in the 0 condition and also provides a voltage level to the oscillator 16 on the lead 29. The oscillator then begins to supply pulses on the lead 17.

In the example given, the relative position 12b is forward of the actual position 12a of the load and accordingly a 1 condition will exist on the lead 25 which opens pulse gate 18 to pass pulses to the forward channel 14 of the motor control means. Moreover, the NOR gate 26 provides a 0 condition to the pulse gate 19, preventing pulses from passing therethrough to the reverse channel. As the oscillator continues to supply pulses on the lead 14, it further supplies them from this lead to the increasing count lead 24 of the position register means 22 which will change its count upwardly one decimal unit for each pulse supplied the motor control means 13.

The oscillator will continue supplying pulses until the count of the position register means equals the command input count when the lead 24 will then change to the 1 condition. Simultaneously, the lead 25 will change to the 0 condition. The change to the 1 condition of the lead 24 will cause the NOR gate 27b to have a 0 condition output which eliminates the voltage level or the lead 29 and causes the oscillator 16 to cease supplying pulses. Thus though pulse gate 19 could pass pulses by the lead 25a being in the 1 condition, none appears on the lead 17.

The number of pulses has been supplied to the motor control means to cause the motor to have moved the number of incremental steps necessary to move the load 12 from the position 12a to the position 12b, the latter being the desired or command position. For the other condition where the load is commanded to be moved from the position 12b to the position 12a, the oscillator will function in a similar manner. However, rather than the pulses passing through the pulse gate 18, they will pass through the pulse gate 19 to cause a reverse movement of the motor. In addition, they will be counted on the lead 22r by the position register means decreasing its count one unit for each pulse supplied until its count is equal to the count of the command input means, when pulses will then cease being applied.

It will be appreciated that upon completion of a movement the system is then ready to accept the next command information to the command input 21 and the system will function to move the load in the direction and extent desired. The position register means will continually maintain a count of the number of pulses received as they are supplied to the motor. Preferably the position register means and the command input are correlated to the same reference point through of course they may have different reference points. If they are the same, then the position register would have a zero count when the edge 12a is aligned with the point 20 and accordingly any movement therefrom caused by a pulse will be stored in the position register means.

The motor 11 and the load 12 both have inertia and in order to maintain the ability of the motor to errorlessly respond to each change of energization, the motor is required to be operated at a relatively slow speed. The inertial forces occurring during the beginning and termination of a movement are generally the larger forces which must be overcome by the motor and hence set the value of the slow speed at which the motor must function throughout its extent of movement. In U.S. application, Ser. No. 426,633, filed Jan. 19, 1965 and assigned to the assignee of the present invention, there is disclosed an oscillator circuit which provides for changing the rate of the pulses so that the motor is caused to accelerate slowly and decelerate slowly but yet may operate at a relatively fast speed for the intermediate portions of the movement. The change in the rate of the pulses occurs at the beginning pulses and at the terminating pulses of the train of pulses required to move the load the desired extent.

Shown in FIG. 2 is a further embodiment of the system of the present invention which enables the motor to be operated at the fast intermediate speed but at a slow speed during acceleration and deceleration by using the oscillator circuit disclosed in said application. Referring to FIG. 2, the system 50 includes the motor 11, load 12 and motor controller 13 having a forward channel 14 and a reverse channel 15. In addition the system includes the position register means 22 having forward or up lead 22f and reverse or down lead 22r and the command input 21. A comparator 51 is employed and is similar to the comparator 23 in that it has two output leads 51a and 51b. The former lead however has a 1 condition whenever the count of the command input 21 exceeds the count of the position register means 22 and the latter lead has a 1 condition only when the position register means has a count greater than the command input. When the counts of the command input and position register means 22 correspond, neither lead has a 1 condition. Groups of leads 21a–21c and 22a–22c interconnect the command input, position register means and comparator.

The system 50 as part of the position register means has a buffer counter 52 which is a forward and reverse counter having a count capacity that is as great as or greater than the terminal number of pulses required for errorless deceleration. One example that has been found satisfactory is a four bit binary counter having a capacity of 15 counts between its maximum, i.e. full, and its minimum, i.e. empty, count conditions. Pulses that would cause the motor to move forward are applied in a lead 52a to cause the count of the buffer count to increase while pulses for decreasing the count and which would cause the motor to move in the reverse direction are applied on a lead 52b. The buffer counter has leads 52c and 52d which serve to indicate the condition of the counter by the lead 52c having a 1 condition whenever the counter is at its maximum count capacity and the lead 52d having a 1 condition level whenever the counter is not at its zero or minimum count condition.

The logic circuit for the system is generally indicated by the reference numeral 53 and includes a plurality of NOR gates and pulse gate. The NOR gates are of conventional design in that whenever at least one input thereof has a 1 condition, the gate's output has a 0 condition and whenever all inputs have a 0 condition, the gate's output is a 1 condition. One specific form of pulse gate 54 which may be employed is shown in FIG. 3. It has a pulse input lead 54a, a pulse output lead 54b and a control input 54c. The pulse gate will enable the passing of pulses from lead 54a to 54b only when the control lead 54c has a voltage level or 1 condition. For the 0 condition of the control lead 55c, pulses will not pass through the gate to the lead 55b.

An oscillator circuit 55 is included in the logic circuit 53 and is enclosed within dotted line 55'. It has an output lead 55a on which pulses appear and a pair of control leads 55b and 55c which determine the rate or frequency of the pulses. A voltage level caused by a 1 condition on the lead 55c will cause the oscillator circuit to produce pulses initially at a low speed but at an increasing rate while the change from a 1 condition to a 0 condition will cause the oscillator means to decrease the pulse rate to a slow speed. The intermediate pulses which occur when the pulse rate is not accelerating and decelerating is at a relatively high speed. The control lead 55b when having a 1 condition thereon causes the oscillator to have a slow pulse rate which is the slowest rate at which the motor is operated. The pulses supplied when this control lead is energized are generally only used to change the count of the position register means 22 including the buffer counter 52 and are applied to the motor control means to move the motor in only the situation where the movement required is a number of incremental steps less than the count capacity of the buffer counter. For a more complete description of the structure and operation of the oscillator circuit reference is made to the above-noted copending application.

The system functions by having either a plus voltage level or a lack thereof, a 1 condition and a 0 condition respectively on each lead and in the following table there is listed opposite the alphabetically indicated lead, the condition which must occur in order for the lead to have a 1 condition.

51a—The command input count is greater than the position register means count.
51b—The position register means count is greater than the command input count.
52c—The buffer counter is full or at its maximum count capacity.
52d—The buffer counter is not at its minimum capacity or empty.
29—The cycle is in operation.
56—The position register means count is equal to the command input count.
57—The motor is required to be energized in a manner which produces forward motion.
58—The motor is required to be energized in a manner which produces reverse motion.

In the system whenever the motor is being energized to move in a forward direction, pulses appear on the leads 14 and 22f. Whenever the motor is being energized for reverse motion, pulses appear on the leads 15 and 22r which in respect to the latter being the down counting lead of the position register means. With respect to the buffer counter 52, when the motor is to move forwardly, the initial pulses are applied on the lead 52a and the termination pulses are applied on the lead 52b, the latter being the down counting lead of the buffer counter. For movement of the motor in the reverse direction, the initial pulses to the buffer counter will appear on the lead 52b and termination pulses on the lead 52a.

In the operation of the system by a starting pulse to the flip-flop 27 on the lead 28 and the counts of the position register means and command input not being equal, the oscillator 55 is energized and pulses are initially fed to the position register means and to the buffer counter but not to the motor controller 13 at a speed determined by the energization of the lead 55b. The buffer counter will continue to accept pulses until it provides a signal on the lead 52c indicating that the counter is at its maximum count capacity. Upon the lead 52c achieving a 1 condition it energizes the lead 55c and the oscillator 55 is caused to produce output pulses at an initially accelerating rate until it achieves the speed set for its intermediate operation. Moreover, the voltage level in lead 52c also enables pulses to be fed to the motor control means 13 and blocks further pulses to the buffer counter 52 though pulses are simultaneously being applied to the position register means 22.

The motor will then operate at its high speed until the pulse occurs which causes the count of the position register means 22 to be identical to the command input count at which time both comparator leads 51a and 51b have a 0 condition. This change serves to block further pulses to the position register means 22 and to apply pulses to the buffer counter while continuing to supply pulses to the motor. The first pulse to the buffer count decreases its count one unit from its full capacity which denergizes the leads 52c and 55c from the 1 condition and changes them to their 0 condition. This decrease in voltage level causes the oscillator to continue to supply pulses at a decreasing rate thereby serving to decelerate the motor until the pulse appears which changes the count of the buffer counter to its zero or empty count. The condition on the lead 52d then changes to 0 and serves to terminate the cycle by changing the state of the flip-flop 27 to shift the condition of the lead 29 to the 0 condition.

As an example of the operation of the circuit, it is assumed that the command input is 800 and that the position register is at 600. This indicates that the motor is to move from its fixed reference position 20 a distance equal to 200 changes of energization. As the command input count is greater than the position register means count, the movement is in the forward direction. Upon applying of a positive pulse to the input 28 of the NOR gate of the flip-flop 27, lead 51a is 1, 51b is 0 and 52d is 0 so that the lead 29 goes to 1. Furthermore, as 51b is 0, it indicates that the position register means count is less than the command input count so lead 58 is caused to be 0 and lead 57 to be 1, the leads 57 and 58 providing directional control as will be hereinafter understood.

The 1 condition of lead 29 causes the oscillator through the lead 55b to supply pulses on lead 55a at a low rate to the six pulse gates (PG1–PG6) connected to the lead 55a. In the instant situation as lead 51a is 1, lead 56 is 0 and lead 52c is 0 indicating the buffer counter is empty, no pulses appear on lead 52a to the buffer counter through the pulse gate PG1. Additionally, the pulse gate PG2 is closed, while pulse gate PG3 is opened as leads 56 and 58 are in the 0 condition and thus pulses are supplied on lead 22f, the forward counting lead of the position register means 22. Also, as lead 57 is 1 and lead 56 is 0, pulses through the pulse gate PG4 are blocked while pulse gates PG5 and PG6 are also blocked as leads 56 and 52c are both 0, pulses PG5 and PG6 being connected to the motor control means lead 14 and 15 respectively.

The buffer counter is herebefore indicated preferably has a count capacity of fifteen pulses and is at its empty count when the cycle began so that when fifteen pulses have appeared on the lead 55a, the lead 52c goes to 1 which closes pulse gate PG1, opens pulse gate PG5 and enables pulses to pass from lead 55a to the forward channel 14 of the motor controller. The pulse gate PG3 continues to remain open to enable pulses to pass to the forward count lead 22f of the position register means. The oscillator means 55, by the lead 55c now having a voltage level accelerates the rate of the pulses to its maximum rate and continues at its maximum rate until the pulse appears which changes the count of the position register means to 800. The position register means count is now at the same count as the command input. Lead 51a then goes to 0 and as lead 51b is also 0, lead 56 changes to 1. The change in the condition of lead 56 opens pulse gate PG2 enabling pulses to pass to the reverse or downward counting lead 52b of the buffer counter. Also, pulse gate PG3 is closed terminating the supplying of pulses to the position register means and pulse gate PG4 remains closed. The next pulse after the counts of the position register means 22 and command input being indicated as equal, is thus fed to the buffer counter through the lead 52b which decreases its count one unit below its maximum count causing the lead 52b to change to a 0 condition.

The change in voltage level of the lead 52b and 55c functions to decrease the rate of the pulses from the oscillator 55 with these being a longer duration between each subsequent pulse. The oscillator continues functioning until the buffer counter has received enough pulses (i.e. fifteen) so that it is at its zero or empty count. The empty count changes the lead 52d to a 0 condition and as leads 52d, 51a and 51b are 0, the flip-flop 27 is caused to revert to its other state. This in turn renders the lead 29 to a 0 condition which stops the oscillator 56, by both leads 55b and 55c being at 0 and thus further pulses are not supplied.

The system after completion of the above-noted cycle is thus ready to perform the next command by the command input count being changed to the next desired position of the motor and the flip-flop 27 energized.

If the next command input differs from the position register means count by less than the count capacity of the buffer counter, the count of the position register means will be changed by the initial pulses until the leads 51a and 51b become in the 0 condition. The leads 52c will never become in the 1 condition and pulses produced by the oscillator means 55 will only be at the slow rate determined by the lead 55b.

It will be understood that for the situation where the count of the command input is less than the count of the position register means, that the lead 58 will be 1, and the pulse gates PG4 and PG1 will be opened and the initial pulses decrease the count of the position register means while increasing the count of the buffer counter. Then pulse gate PG1 will close, and pulse gate PG6 open to supply pulses on the reverse channel until the count of the position register means 22 is equal to the count of the command input. The pulse gate PG4 will then be closed and pulse gate PG2 opened until the buffer counter reaches its minimum count which deenergizes the system.

From the foregoing, it will be appreciated that there has been disclosed a system for accepting information in absolute form as to a desired position of a load and causing a load to be moved from wherever it is at to the desired position. The system does not depend on an initial computation to determine the amount and extent of movement but instead relies on a signal provided by comparing the counts of the command information and a count of a position register means that is related to the motor position. The signal indicates whichever count is larger and the motor is caused to move in a direction which decreases the count difference. So long as a difference exists, the motor is operated and will cease moving when the signal changes, indicating that the counts of the command input and position register means are equal. At its cessation of movement, the motor has been energized to move the number of increments necessary to cause it to achieve the commanded position.

As a further embodiment of the present invention, in order to enable a higher speed of operation of the motor, the position register means includes a buffer counter that serves with the position register means to provide a false completion signal prior to the motor achieving its commanded position. The false completion signal is employed to decelerate the speed of the motor to enable it to maintain control of the load as it is brought to its achieved position. The buffer counter initially stores the number of steps that the motor will require to decelerate without error without initially moving the motor and then after the false completion signal the number of pulses equal to the stored number is applied to the motor at a decreasing rate.

Variations and modifications may be made within the scope of the claims and portions of the improvements may be used without others.

I claim:

1. A numerically controlled system of the absolute type comprising a motor adapted to be connected to a load to move the load an increment for each change of energization supplied to said motor, motor control means having an input on which pulses are applied and an output connected to the motor for supplying a change of energization to said motor for each pulse applied, oscillator means for supplying pulses, position register means for maintaining a count representative of the position of the load from a reference position and for changing its count for each change of energization of the motor by receiving pulses from the oscillator means, command input means for maintaining a count representative of the number of changes of energization required to move the load from a reference position to a command position, comparator means for supplying at least a signal representative of the relationship between the count of the position register means and the command input means, enabling means for enabling the supplying of pulses to the motor controller from the pulse supply means, and means interconnected with the enabling means and the motor controller for preventing the changes of energization upon the count of the position register means coinciding relatively with the count of the command input means.

2. The invention as defined in claim 1 in which the motor controller has two channels on either of which pulses may be applied to cause said motor to move in one direction or the other, and means connected to the comparator means for selecting on which channel the pulses are to be applied.

3. The invention as defined in claim 2 in which the last-named selecting means includes a pulse gate in series with each channel, the comparator means has a direction output signal indicating that the count of either the position register means or the command input means is higher than the other, and means for applying the direction output signal to the pulse gate with one pulse gate being blocked when the position register has the higher count and the other pulse gate being blocked when the command input has the higher count.

4. The invention as defined in claim 1 in which the signal from the comparator means indicates the condition of either that the count of the command input means is greater than the count of the position register means or that the count of the command input means is less than the count of the position register or that the counts are equal, and in which said signals are maintained for each change of energization of the motor.

5. The invention as defined in claim 4 in which the comparator means compares the counts of the command input means and position register means for each pulse and shifts its signal when the pulse appears that changes the relative relationship of the counts from one condition to another.

6. The invention as defined in claim 1 in which the position register means includes a buffer counter means, said counter means having selected minimum and maximum count limits, and in which the position register means coincides relatively with the count of the command input means only when the buffer counter is at one of its count limits.

7. The invention as defined in claim 1 in which the position register means includes a buffer counter means connected to receive pulses, said counter means having selected minimum and maximum count limits, and in which at least one of the position register means and the buffer counter means changes its count for each change of energization of the motor.

8. The invention as defined in claim 7 in which the count of the buffer counter and the count of the position register means are changed for a number of pulses, and in which pulse gate means block the said number of pulses from effecting changes of energization of the motor.

9. A numerically controlled system of the absolute type comprising a motor adapted to be connected to a load to move the load an increment for each change in energization supplied to the motor, motor control means having an input on which pulses are supplied and an output connected to the motor for supplying a change of energization for each pulse supplied, oscillator means for supplying pulses and having a control which upon energization produces pulses at least at a high rate and which upon deenergization supplies pulses at a lower rate, position register means for maintaining a count representative of the position of the load from a reference point and for changing its count for each change of energization to the motor by receiving pulses from the oscillator means, command input means for maintaining a count representative of the number of changes of energization required to move the load from a reference position to a desired position, comparator means for supplying a signal indicative of the relationship between the counts of the position register means and the command input means, means for energizing the pulse supply means control when the counts are different and means for deenergizing the control a selected number of pulses prior to the change of energization that would cause the load to be at the desired position to thereby decrease the speed of the motor as the load approaches the desired position.

10. The invention as defined in claim 9 in which the position register means includes a buffer counter, said counter having selected maximum and minimum count limit conditions, and in which the selected number of pulses is the count between the two conditions.

11. The invention as defined in claim 10 in which the total count of the position register means equals the count of the command input means only when the buffer counter is at one of its count limit conditions.

12. The invention as defined in claim 10 in which the system includes circuit means for directing the initial pulses of the train of pulses from the pulse supply means that causes the desired movement of the motor to the position register means and blocks them from the motor control means.

13. The invention as defined in claim 12 in which the terminal pulses of the train of pulses are directed to the motor control means and subtracted from the count of the buffer counter and said terminal pulses being equal in number to the number of pulses initially blocked from the motor control means.

14. The invention as defined in claim 12 in which the pulse supply means includes an additional control which upon energization causes the supplying of pulses at a slow rate, and in which the circuit means energizes the additional control for the initial pulses.

15. The invention as defined in claim 9 in which the pulse supply means has an additional control which upon energization causes the supplying of pulses at a slow rate, and in which the circuit means energizes the additional control whenever the number of changes of energization required to move the load to the desired position is less than the number of changes of energization produced by the selected number of pulses.

References Cited

UNITED STATES PATENTS

| | | | |
|---|---|---|---|
| 3,098,187 | 7/1963 | Sciaky | 318—162 XR |
| 3,172,026 | 3/1965 | Schuman | 318—28 |
| 3,218,532 | 11/1965 | Toscano | 318—18 XR |
| 3,378,741 | 4/1968 | Sutton | 318—18 |
| 3,400,314 | 9/1968 | Wilson | 318—18 |

B. DOBECK, Primary Examiner

U.S. Cl. X.R.

318—138